United States Patent
Niino

(10) Patent No.: US 8,434,830 B2
(45) Date of Patent: May 7, 2013

(54) BRAKE CONTROL APPARATUS

(75) Inventor: Hiroaki Niino, Toyota (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 655 days.

(21) Appl. No.: 12/363,080

(22) Filed: Jan. 30, 2009

(65) Prior Publication Data

US 2009/0195057 A1 Aug. 6, 2009

(30) Foreign Application Priority Data

Feb. 1, 2008 (JP) ................................. 2008-023128

(51) Int. Cl.
*B60T 13/00* (2006.01)
*B60T 13/74* (2006.01)

(52) U.S. Cl.
USPC ........................... 303/20; 303/113.4; 303/191

(58) Field of Classification Search ................ 303/3, 15, 303/20, 113.4, 191, DIG. 1, DIG. 2; 188/1.11 E, 188/1.11 I, 1.11 R, 158, 159; 701/70, 78
See application file for complete search history.

(56) References Cited

U.S. PATENT DOCUMENTS

| | | | |
|---|---|---|---|
| 6,474,751 B1 * | 11/2002 | Yamaguchi et al. | 303/116.4 |
| 7,806,486 B2 * | 10/2010 | Bitz | 303/20 |
| 2002/0091479 A1 | 7/2002 | Maruko et al. | |
| 2004/0019426 A1 * | 1/2004 | Knoop et al. | 701/301 |
| 2008/0001476 A1 * | 1/2008 | Franzke et al. | 303/177 |

FOREIGN PATENT DOCUMENTS

| | | |
|---|---|---|
| JP | 2002-205630 A | 7/2002 |
| JP | 2004-161174 A | 6/2004 |
| JP | 2007-320459 A | 12/2007 |

OTHER PUBLICATIONS

Japanese Official Action, and English-language translation, dated Feb. 21, 2012 issued in the corresponding Japanese Patent Application No. 2008-023128.

* cited by examiner

*Primary Examiner* — Melody Burch
(74) *Attorney, Agent, or Firm* — Buchanan Ingersoll & Rooney PC

(57) ABSTRACT

An electronic control unit for a brake control apparatus has a pressure-command-signal memorizing portion, which outputs a pressure command signal to a brake force control unit, when a braking operation is not carried out by a vehicle driver, in order to gradually increase brake fluid pressure. The memorizing portion memorizes the pressure command signal as a gap-zero pressure signal sent to the brake force control unit when vehicle deceleration exceeds a predetermined value. A pre-charge control portion outputs the gap-zero pressure signal to carry out a pre-charge control, when the braking operation is not carried out, so that a gap between a friction element and a non-friction element is reduced to a desired amount before an actual braking operation by the vehicle driver.

4 Claims, 6 Drawing Sheets

BRAKE CONTROL APPARATUS

CROSS REFERENCE TO RELATED APPLICATION

This application is based on Japanese Patent Application No. 2008-023128 filed on Feb. 1, 2008, the disclosure of which is incorporated herein by reference.

FIELD OF THE INVENTION

The present invention relates to a brake control apparatus for a vehicle.

BACKGROUND OF THE INVENTION

A brake control apparatus for a vehicle is known in the art, as disclosed, for example, in Japanese Patent Publication No. 2004-161174. According to such a prior art, a pre-charge control is carried out before an actual braking operation of a vehicle driver, in order to apply a braking fluid pressure to a brake pad independently from the actual braking operation of the vehicle driver. As a result of such pre-charge control, a gap between a disc rotor (a non-friction element) and the brake pad (a friction element) is reduced, so that a braking force is immediately applied to vehicle wheels when the braking operation is actually carried out by the vehicle driver.

In the above mentioned prior art, temperature of the disc rotor may be largely increased due to heat generated by the braking operation, and a sliding surface of the disc rotor (which is repeatedly brought into contact with the brake pad) may be inclined due to thermal expansion caused by such temperature increase (hereinafter such inclination is referred to as thermal inclination). When the thermal inclination occurs, a relative distance between the disc rotor and the brake pad will be decreased. Under such a situation, an unintentional vehicle deceleration may occur, if the pre-charge control with a predetermined braking fluid pressure is carried out.

On the other hand, the relative distance between the disc rotor and the brake pad is increased, when the brake pad is worn away, or when the brake pad is pushed back by the disc rotor due to the occurrence of the thermal inclination and then the disc rotor is restored from its thermal inclination to its normal condition due to cool-down of the disc rotor.

Under such a situation, the relative distance (gap) between the disc rotor and the brake pad remains at such an amount larger than a target distance, even when the pre-charge control with the predetermined braking fluid pressure is carried out. As a result, the braking force may not be immediately applied to the vehicle wheels when the braking operation is actually carried out by the vehicle driver.

SUMMARY OF THE INVENTION

The present invention is, therefore, made in view of the foregoing problem, and has an object to provide a brake control apparatus, according to which a relative distance (gap) between a friction element and a non-friction element is precisely controlled by a pre-charge control, even when the gap between the friction element and the non-friction element is changed.

According to a feature of the invention, a brake control apparatus for a vehicle has;

an electronic control unit for controlling the brake control apparatus;

a braking force control unit having a non-friction element provided at each of vehicle wheels, a friction element to be pushed against the non-friction element to generate braking force at respective vehicle wheels, and a hydraulic brake actuator for controlling brake fluid pressure applied to the friction element upon receiving a pressure command signal from the electronic control unit; and a vehicle deceleration detecting device for detecting vehicle deceleration.

The electronic control unit has a pressure-command-signal memorizing portion, which outputs the pressure command signal to the brake force control unit, when a braking operation is not carried out by a vehicle driver, in order to gradually increase the brake fluid pressure, and the pressure-command-signal memorizing portion memorizes the pressure command signal as a gap-zero pressure signal, which is sent to the brake force control unit when the vehicle deceleration detected by the vehicle deceleration detecting device exceeds a predetermined value.

Furthermore, the electronic control unit has a pre-charge control portion, which outputs the gap-zero pressure signal to the brake force control unit in order to carry out a pre-charge control, when the braking operation is not carried out by the vehicle driver, so that the friction element is pushed forward to the non-friction element in order that a gap between the friction element and the non-friction element is reduced to a desired amount before an actual braking operation by the vehicle driver.

According to the above feature of the invention, the pressure command signal memorized in the pressure-command-signal memorizing portion is increased, when the gap between the friction element and the non-friction element is increased due to a deformation after the thermal inclination. The increased pressure command signal is sent to the braking force control unit so as to carry out the pre-charge control. Accordingly, it is possible to precisely reduce the gap between the friction element and the non-friction element during the pre-charge control, even after the gap is increased.

According to another feature of the invention, the pre-charge control portion corrects the gap-zero pressure signal to such a corrected amount, with which no braking force is applied to the vehicle, and the pre-charge control portion carries out the pre-charge control based on the corrected amount of the gap-zero pressure signal.

According to such a feature, a drive feeling is improved, because deceleration is not applied to the vehicle even when the pre-charge control is carried out.

According to a further feature of the invention, the brake control apparatus further has a pedal stroke sensor for detecting a pedal stroke of a brake pedal operated by the vehicle driver. And the pressure-command-signal memorizing portion determines whether the pedal stroke, which is detected by the pedal stroke sensor when the vehicle deceleration detected by the vehicle deceleration detecting device exceeds the predetermined value, is within a predetermined range, and the pressure-command-signal memorizing portion memorizes the pressure command signal when the pedal stroke is not within the predetermined range.

According to such a feature, the pressure-command-signal memorizing portion memorizes the latest pressure command signal, whenever the gap between the friction element and the non-friction element is changed. As a result, it is possible to precisely reduce the gap between the friction element and the non-friction element during the pre-charge control.

According to a still further feature of the invention, the brake control apparatus further has a braking operation detecting device for detecting whether the braking operation is carried out by the vehicle driver, and the pre-charge control portion outputs the pressure command signal to the braking force control unit, when a start of the braking operation is detected.

According to such a feature, it is possible to immediately generate the braking force when the braking operation is carried out by the vehicle driver, because the gap between the friction element and the non-friction element is already reduced before the braking operation of the vehicle driver.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
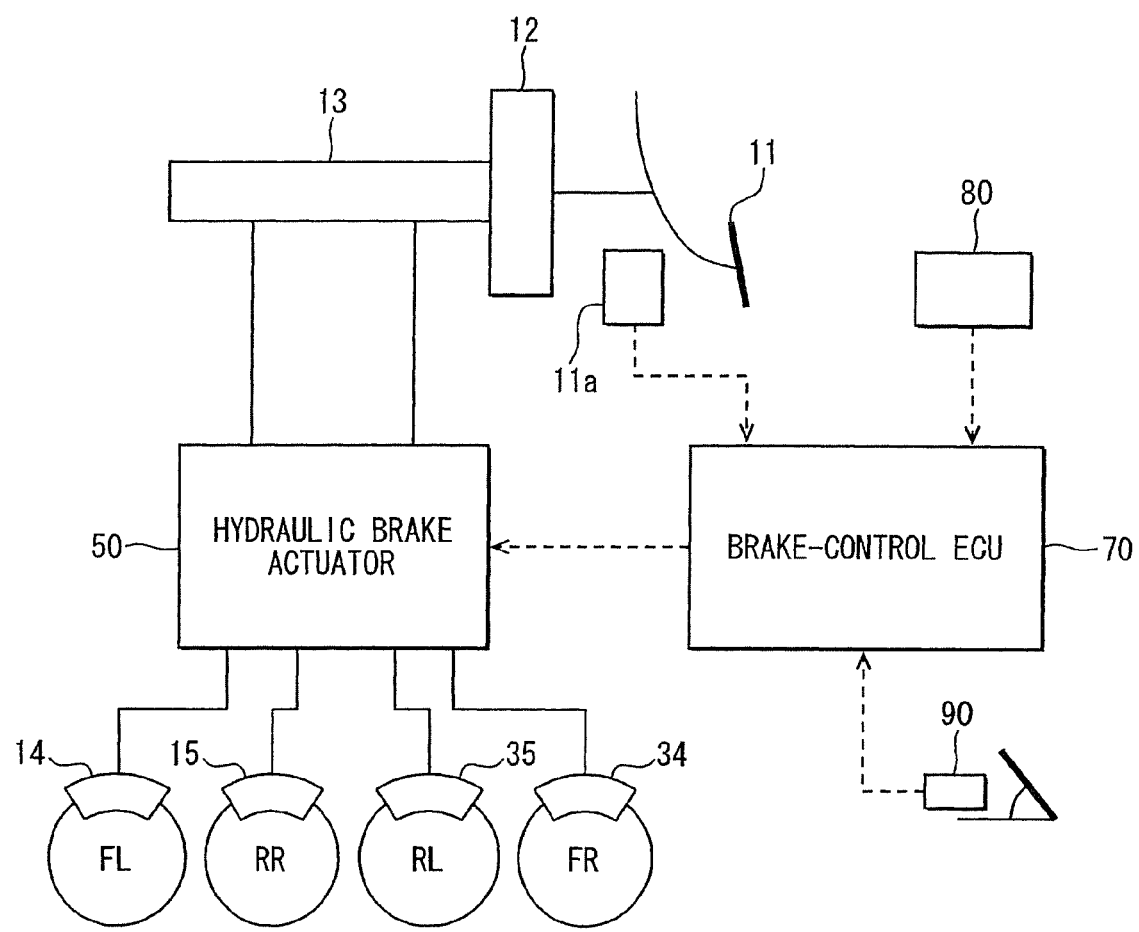
FIG. 1 is a schematic view showing an entire structure of a brake system for a vehicle, to which a brake control apparatus according to an embodiment of the present invention is applied.

FIG. 1 is a schematic view showing an entire structure of a brake system for a vehicle, to which a brake control apparatus according to an embodiment of the present invention is applied. The brake control apparatus can be applied to any kinds of vehicles, such as a vehicle having an internal combustion engine, an electric vehicle, and so on.

The structure of the brake system will be hereinafter explained with reference to FIG. 1. As shown in FIG. 1, the brake system has a brake operating device 11, a brake booster 12, a master cylinder 13, a braking operation detecting device 11a, a vehicle deceleration detecting device 80, a front-left (FL) wheel cylinder 14, a front-right (FR) wheel cylinder 34, a rear-left (RL) wheel cylinder 35, a rear-right (RR) wheel cylinder 15, a hydraulic brake actuator 50 for controlling brake fluid pressure, a brake-control ECU 70, and an accelerating operation detecting device 90.

The brake operating device 11 comprises a brake pedal operated by a vehicle driver for transmitting a brake operating force of the vehicle driver to the brake booster 12. The brake operating device 11 may comprise a brake lever, when the present invention is applied to a motorcycle. The brake booster 12 increases the brake operating force of the vehicle driver and comprises, for example, a vacuum booster utilizing negative pressure of an internal combustion engine.

The master cylinder 13 generates brake fluid pressure to be applied to the respective wheel cylinders (14, 15, 34, 35), depending on a brake operating amount of the vehicle driver (for example, a stroke amount of the brake pedal). In FIG. 1, the master cylinder 13 is shown as being mechanically connected to the brake pedal 11. However, the brake operating amount may be electrically detected, and the brake fluid pressure may be controlled by a pump depending on the detected brake operating amount.

The braking operation detecting device 11a detects whether the brake pedal 11 is operated by the vehicle driver or not. For example, the braking operation detecting device 11a may comprise a brake switch, electrical contacts of which are turned on or turned off depending on even a slight movement of the brake pedal 11, or a pedal stroke sensor, and so on.

The vehicle deceleration detecting device 80 may comprise a deceleration sensor (so called a G sensor) mounted in the vehicle for directly detecting the vehicle deceleration, or an estimating device for calculating the vehicle deceleration based on wheel speed of a wheel speed sensor, or another estimating device for calculating the vehicle deceleration based on outside images of the vehicle, or a further estimating device for calculating the vehicle deceleration based on changes of vehicle position information of a car navigation system, and so on. A vehicle braking force is detected by the vehicle deceleration detecting device 80 based on the detected vehicle deceleration.

The accelerating operation detecting device 90 detects whether there exists an accelerating operation for the vehicle. For example, the accelerating operation detecting device 90 may comprise a device having a position sensor for detecting an operation of an acceleration pedal operated by the vehicle driver, or a device having an angular sensor for detecting an opening degree of a throttle valve, or a device which receives information for fuel injection amount or engine output torque from an engine control unit via an on-vehicle communication network and compares such information with a predetermined value in order to determine whether the accelerating operation is carried out or not.

Each of the FL wheel cylinder 14, the FR wheel cylinder 34, the RL wheel cylinder 35 and the RR wheel cylinder 15 is provided at respective wheel portions. Each of the wheel cylinders generates the braking force by pushing a friction element (such as, a brake pad, a brake shoe, or the like: the brake pad is used as the friction element in the present embodiment) toward a non-friction element attached to the wheel (such as, a disc rotor, a brake drum or the like: the disc rotor is used as the non-friction element in the present embodiment) depending on fluid pressure of the brake fluid applied to the wheel cylinder.

Figure 6:
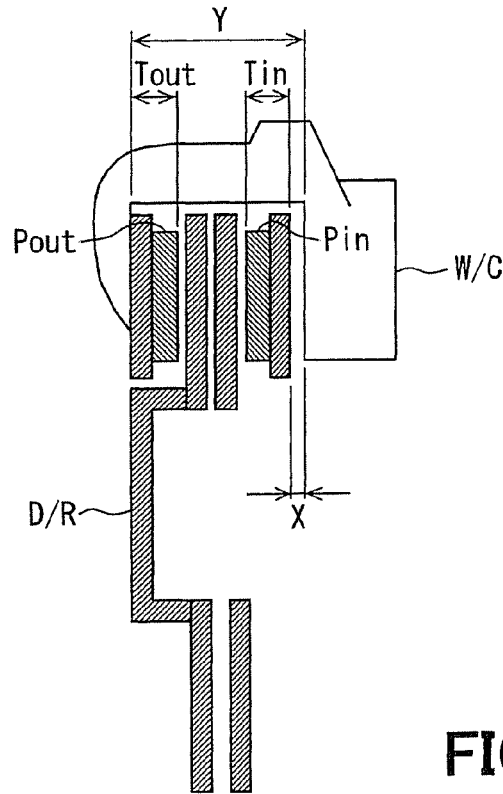
FIG. 6 shows an example for initial positions of a wheel cylinder, a disc rotor and brake pads.

In each of the wheel cylinders 14, 15, 34, 35, the brake pads (Pin and Pout) are pulled back by a restoring force of elastic deformation of a seal member (or a return spring) provided between a piston and a cylinder, when the fluid pressure of the brake fluid is not applied to the wheel cylinder. As a result, a gap is formed between the brake pads (Pin, Pout) and the disc rotor (D/R), for example, as shown in FIG. 6.

The brake-control ECU 70 is connected to the braking operation detecting device 11a, the vehicle deceleration detecting device 80, the accelerating operation detecting device 90, and the hydraulic brake actuator 50 for controlling brake fluid pressure, and comprises a micro-computer, RAM, ROM and so on.

The brake-control ECU 70 corresponds to a memory device for pressure command signals and a pre-charge control portion.

The hydraulic brake actuator 50 for controlling brake fluid pressure is connected to the master cylinder 13, the respective wheel cylinders 14, 15, 34, 35, and the brake-control ECU 70. The hydraulic brake actuator 50 has a pump and various kinds of control valves, which are operated by command signals from the brake-control ECU 70, so that a normal braking operation with ABS control (an operation of an anti-lock braking system), a traction control and so on can be carried out. In addition, the brake fluid is supplied to the respective wheel cylinders 14, 15, 34, 35 to generate the braking force, independently from the normal braking operation of the vehicle driver, as explained hereinafter.

The hydraulic brake actuator 50, the respective wheel cylinders 14, 15, 34, 35, the brake pads respectively provided at the wheel cylinders, and the disc rotors respectively provided at the wheels correspond to a braking force control unit of the present invention.

Figure 2:
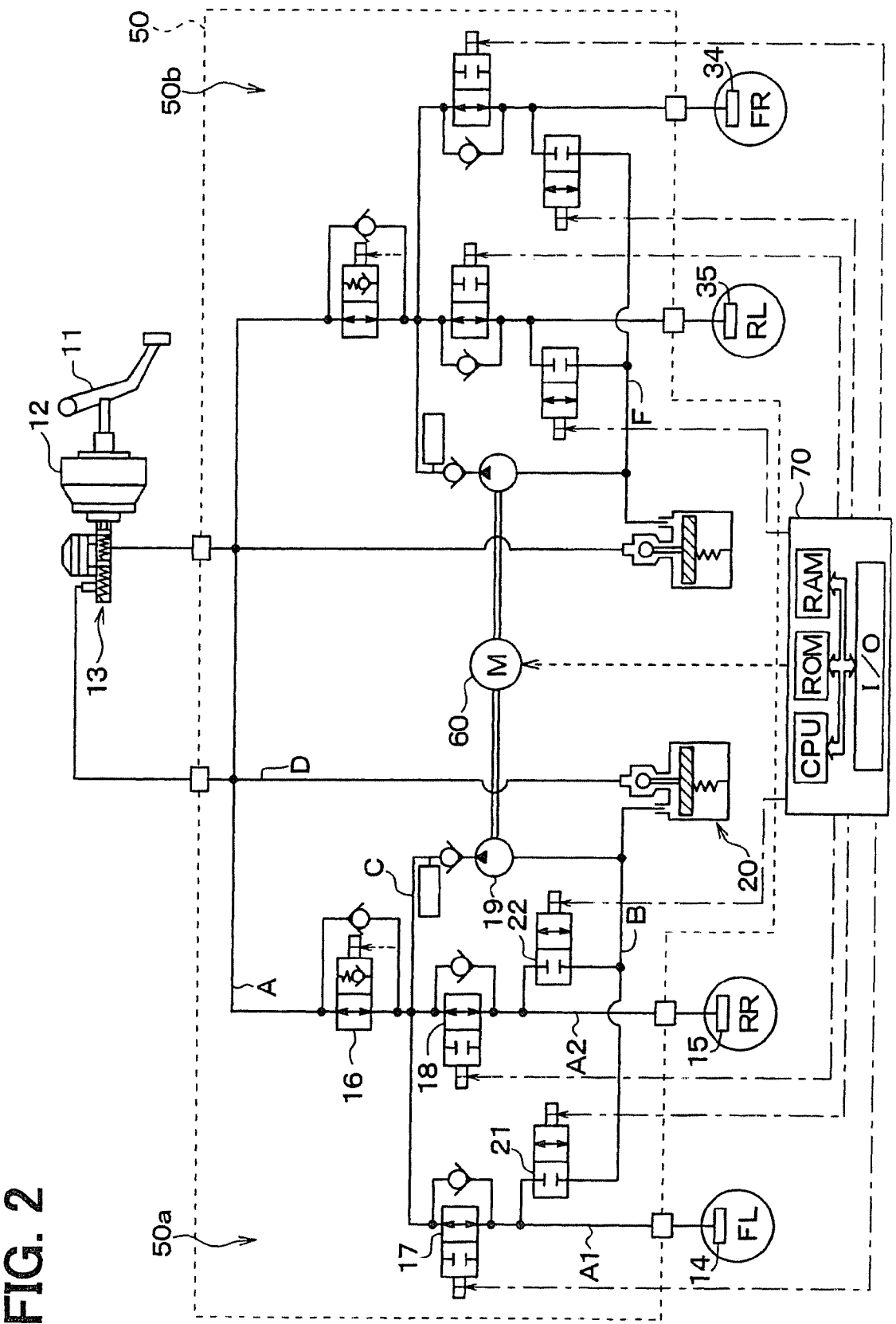
FIG. 2 shows an example for a structure of a hydraulic brake actuator 50.

FIG. 2 shows an example of a structure for the hydraulic brake actuator 50.

The hydraulic brake actuator 50 for controlling the brake fluid pressure has a first hydraulic circuit 50a and a second hydraulic circuit 50b. The first hydraulic circuit 50a controls the brake fluid pressure to be applied to the wheel cylinders 14 and 15 of a front-left wheel FL and a rear-right wheel RR, whereas the second hydraulic circuit 50b controls the brake fluid pressure to be applied to the wheel cylinders 34 and 35 of a front-right wheel FR and a rear-left wheel RL.

Since the first and second hydraulic circuits 50a and 50b have the same structure to each other, an explanation will be made hereinafter only for the first hydraulic circuit 50a. An explanation for the second hydraulic circuit 50b is therefore omitted.

The first hydraulic circuit 50a has a main fluid passage A, through which M/C pressure of the master cylinder 13 is applied to the wheel cylinder 14 for the front-left wheel FL as well as the wheel cylinder 15 for the rear-right wheel RR, so that W/C pressure is generated at the respective wheel cylinders.

A first differential pressure regulating valve 16, which switches over from a communication state to a differential pressure state and vice versa, is provided in a main fluid passage A. The differential pressure regulating valve 16 is so designed that a valve position thereof is in the communication state, in a normal braking operation which is carried out when the brake pedal 11 is depressed by the vehicle driver. The differential pressure regulating valve 16 is further designed that the valve position is changed when electric power is supplied to a solenoid coil thereof, so that the differential pressure becomes larger as the electric power to the solenoid coil is larger. Accordingly, the differential pressure generated by the differential pressure regulating valve 16 can be linearly changed by setting the amount of the electric power to the solenoid coil.

In the case that the differential pressure regulating valve 16 is switched to the differential pressure state, the brake fluid is allowed to flow from the wheel cylinders 14 and 15 to the master cylinder 13 only when the brake fluid pressure on a side of the wheel cylinders 14 and 15 becomes higher by a predetermined amount than the brake fluid pressure on a side of the master cylinder 13. Accordingly, the brake fluid pressure on the side of the wheel cylinders 14 and 15 is always controlled at such a value, which is higher than the brake fluid pressure on the side of the master cylinder 13.

The main fluid passage A is branched out to fluid passages A1 and A2 at a downstream side of the differential pressure regulating valve 16 to the side of the wheel cylinders 14 and 15. A first pressure increase valve 17 is provided in the fluid passage A1 for controlling the pressure increase of the brake fluid to the wheel cylinder 14, and a second pressure increase valve 18 is likewise provided in the fluid passage A2 for controlling the pressure increase of the brake fluid to the wheel cylinder 15.

Each of the first and second pressure increase valves 17 and 18 is composed of an electromagnetic 2-position valve, wherein a valve position is switched from a communication state (an opened state) to a non-communication state (a closed state) and vice versa.

Each of the first and second pressure increase valves 17 and 18 is a normally open type valve. Therefore, the valve position is switched to the opened state when no control current is supplied to a solenoid of the pressure increase valve (17, 18), whereas the valve position is switched to the closed state when the control current is supplied to the solenoid of the pressure increase valve (17, 18).

A fluid passage B connects each of intermediate points between the first and second pressure increase valves 17 and 18 and the wheel cylinders 14 and 15 with a pressure regulating reservoir 20. A first and a second pressure decrease valve 21 and 22 are respectively provided in the fluid passage B. Each of the pressure decrease valve 21 and 22 is likewise composed of an electromagnetic 2-position valve, wherein a valve position is switched from a communication state (an opened state) to a non-communication state (a closed state) and vice versa. And those pressure decrease valve 21 and 22 are normally closed type valves.

A fluid passage C is provided as a fluid return line between the pressure regulating reservoir 20 and the main fluid passage A. A fluid pump 19 driven by an electric motor 60 is provided in the fluid passage C, wherein the pump 19 draws the brake fluid from the pressure regulating reservoir 20 and pumps out pressurized brake fluid to the master cylinder 13 or to the wheel cylinders 14 and 15. The electric motor 60 is operated by controlling power supply to a motor relay (not shown).

A further fluid passage D is provided between the pressure regulating reservoir 20 and the master cylinder 13, through which the pump 19 draws the brake fluid from the master cylinder 13 to pump out the pressurized brake fluid to the main fluid passage A and to the fluid passages A1 and A2. The brake fluid is thus supplied to the wheel cylinders 14 and 15 by the pump 19 to increase the wheel cylinder pressure, for the purpose of carrying out a vehicle behavior control, such as the anti-lock brake control (ABS control), the traction control, and so on, in addition to the pre-charge control of the present invention as explained below.

An operation will be explained, according to which the brake fluid pressure to be applied to the respective wheel cylinders 14, 15, 34, and 35 is increased to a desired pressure for the purpose of carrying out the pre-charge control or carrying out a process for determining (and memorizing) a brake fluid pressure with which the relative distance (the gap) between the brake pads and the disc rotor is brought to zero. Hereinafter, the brake fluid pressure for bringing the gap to zero is referred to as "a gap-zero pressure", and the process for determining and memorizing the gap-zero pressure is referred to as "a pressure-command-signal memorizing process". The explanation is made to the operation for the front-left wheel cylinder 14, as an example.

In a normal operational condition, the first differential pressure regulating valve 16 and the first and second pressure increase valves 17 and 18 are brought into the opened state (the communication state) so that upstream and downstream fluid passages of each valve 16, 17 and 18 are communicated with each other, whereas the first and second pressure decrease valves 21 and 22 are brought into the closed state (the non-communication state) in which communication between the upstream and downstream fluid passages of each valve 21, 22 is cut off.

The differential pressure regulating valve 16 sets a relief pressure at a desired value depending on an output (for example, electric current value) converted from the pressure command signal outputted from the brake-control ECU 70, so that the brake fluid is released from the wheel cylinder side to the master cylinder side at the relief pressure. As explained above, the pump 19 is connected to the electric motor 60, the operation of which is started or stopped (turned on or turned off) depending on an output from the brake-control ECU 70.

When the braking pressure is applied to the wheel cylinder 14, the output (corresponding to a target pressure command signal) is supplied from the brake-control ECU 70 to the differential pressure regulating valve 16. In addition, the operation of the electric motor 60 is started, so that the brake fluid drawn from the fluid passage D and the reservoir 20 is supplied to the wheel cylinder 14 by the operation of the pump 19 driven by the electric motor 60 through the fluid passage A1.

In this operation, as explained above, the first and second pressure increase valves 17 and 18 are opened, the first and second pressure decrease valve 21 and 22 are closed, and the differential pressure regulating valve 16 is closed until the fluid pressure at the downstream side thereof reaches at the relief pressure. Accordingly, all of the brake fluid pumped out from the pump 19 is supplied to the wheel cylinder 14.

When the fluid pressure at the downstream side of the differential pressure regulating valve 16 reaches at the relief pressure, the differential pressure regulating valve 16 is brought into the opened state, so that excessive amount of the brake fluid returns to the pump 19 through the differential pressure regulating valve 16, the main fluid passage A and the fluid passage D. The brake fluid is hereafter circulated from the pump 19 and back to the pump 19 via the fluid passage C, the differential pressure regulating valve 16, the main fluid passage A and the fluid passage D.

Accordingly, the brake fluid is supplied to the wheel cylinder 14 and the brake fluid pressure is generated and controlled at the desired braking pressure, so that the pre-charge control or the pressure-command-signal memorizing process can be carried out.

The operation is explained only for the wheel cylinder 14. However, it is needless to say that the brake fluid can be likewise supplied to the other wheel cylinders 15, 34 and 35 so that the brake fluid pressure is controlled at the desired braking pressure.

Figure 3:
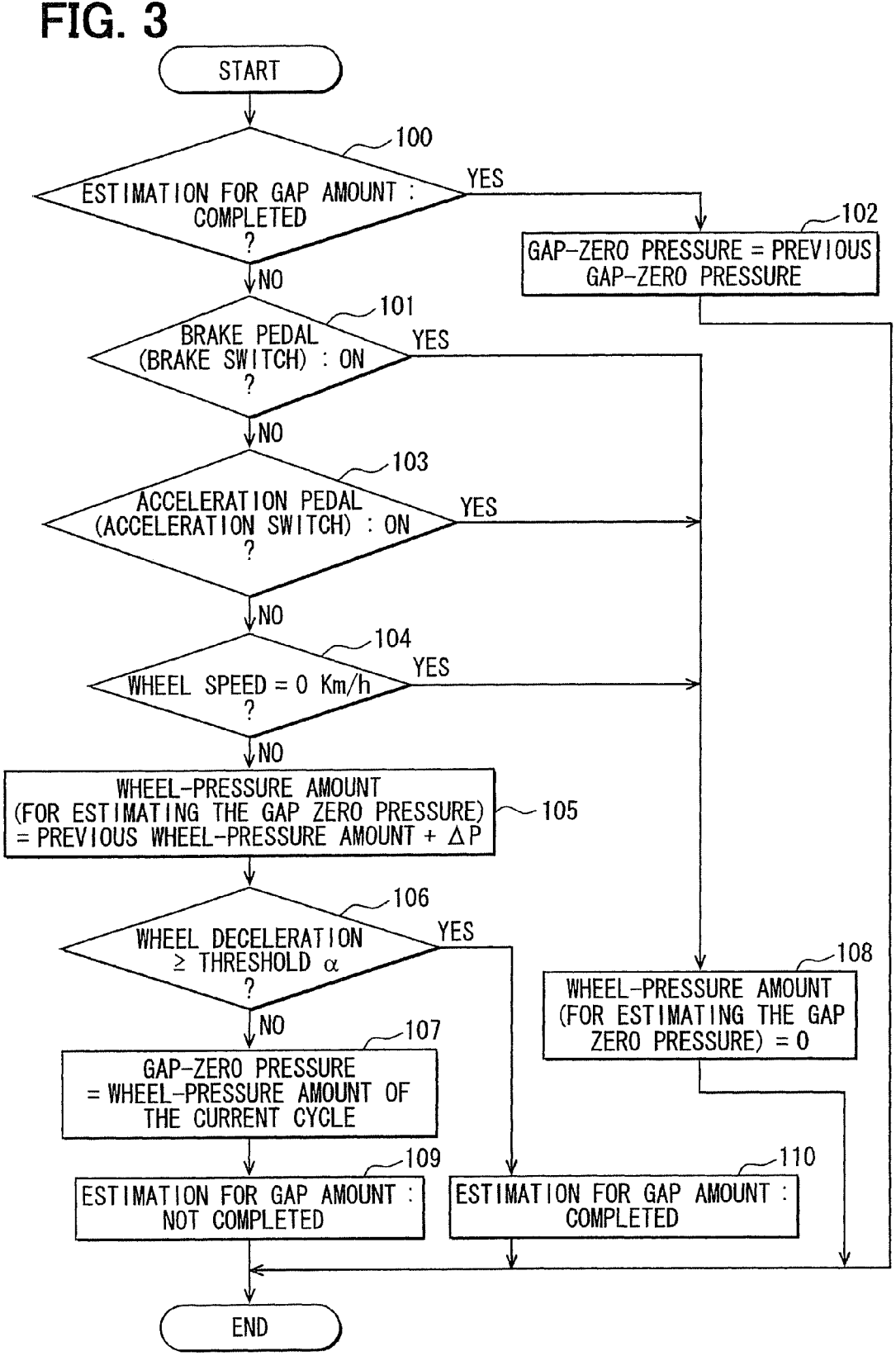
FIG. 3 is a flow-chart showing a process for memorizing a pressure command signal, which is carried out by a brake-control ECU 70.

An example of the operation for the pressure-command-signal memorizing process, which is carried out by the brake-control ECU 70 (hereinafter also simply referred to as ECU 70), will be explained with reference to a flow-chart shown in FIG. 3. The process of FIG. 3 is repeatedly carried out by the ECU 70 at a predetermined calculating period, when an ignition switch (not shown) provided in the vehicle is turned on. At first, the ECU 70 determines at a step 100 whether the pressure-command-signal memorizing process is completed or not. In other words, the ECU 70 determines whether estimation for gap amount (the relative distance between the brake pads and the disc rotor) is completed or not. In the case that the estimation for the gap amount has not yet been finished at an initial condition when the ignition switch is turned on, the process goes to a step 101 and following steps to carry out (complete) the pressure-command-signal memorizing process (that is, the estimation for the gap amount).

At the step 101, the ECU 70 determines whether the vehicle driver carries out the braking operation, based on the input from the braking operation detecting device 11a. In the case that the brake pedal is not operated (the brake pedal, i.e. the brake switch, is not ON), namely in the case that the braking operation is not carried out by the vehicle driver, the process goes on to a step 103 in order to carry out the pressure-command-signal memorizing process.

In the case that the brake pedal (the brake switch) is ON, the pressure-command-signal memorizing process is not carried out, because the brake fluid is supplied to the wheel cylinders as a result of the braking operation of the vehicle driver. In such a case, the process goes to a step 108. At the step 108, a wheel-pressure amount for estimating the gap-zero pressure, namely the pressure command signal to the hydraulic brake actuator 50, is made to zero. Then, the pressure-command-signal memorizing process is ended.

At the step 103, the ECU 70 determines, based on the input from the accelerating operation detecting device 90, whether the vehicle driver carries out the accelerating operation. In the case that the acceleration pedal is not operated (the acceleration pedal, i.e. the acceleration switch, is not ON), the process goes on to a step 104 in order to carry out the pressure-command-signal memorizing process.

In the case that the acceleration pedal (the acceleration switch) is ON, the process goes to the step 108, because acceleration and/or deceleration of the vehicle may not be stable during the accelerating operation. At the step 108, as explained above, the wheel-pressure amount (i.e. the pressure command signal to the hydraulic brake actuator 50) is made to zero, and the pressure-command-signal memorizing process is ended.

At the step 104, the ECU 70 determines whether the vehicle is running or not. In the case that the vehicle is running, namely when wheel speed is not zero, the process goes to a step 105 in order to carry out the pressure-command-signal memorizing process.

In the case that the wheel speed is zero, namely the vehicle is stopped, the process goes to the step 108, because there occurs no change in the vehicle deceleration irrespectively of the braking operation. At the step 108, as explained above, the wheel-pressure amount (i.e. the pressure command signal to the hydraulic brake actuator 50) is made to zero, and the pressure-command-signal memorizing process is ended.

At the step 105, the wheel-pressure amount for estimating the gap-zero pressure, which corresponds to the brake fluid pressure achieved by the pressure command signal sent to the hydraulic brake actuator 50, is increased by "$\Delta P$". Namely, the brake fluid pressure, which is higher than the previous brake fluid pressure by "$\Delta P$", will be applied to the wheel cylinders, so that the brake pads are pushed forward to the disc rotor to gradually decrease the gap between the brake pads and the disc rotor. When the step 105 is repeated by each calculating cycle, the brake pads are gradually pushed forward to the disc rotor, to finally bring the gap between the brake pads and the disc rotor to zero. And thereafter, the braking force is applied to the vehicle, so that the vehicle deceleration will be made larger as the brake fluid pressure is increased.

At a step 106, the ECU 70 determines, based on an input signal from the vehicle deceleration detecting device 80, whether the vehicle deceleration is increased above a predetermined value, for example whether wheel speed deceleration is increased over "a threshold value $\alpha$". As explained above, after the gap between the brake pads and the disc rotor has become zero, the vehicle deceleration will be made larger as the brake fluid pressure is increased. Accordingly, it is possible to obtain (and memorize) the pressure command signal, which is sent to the braking force control unit (including the hydraulic brake actuator 50, the brake pads and the disc rotor) when the gap between the brake pads and the disc rotor has become zero, by detecting the increase of the vehicle deceleration.

When the ECU determines at the step 106 that the vehicle deceleration is not increased over the predetermined value, namely when the wheel speed deceleration is lower than "the threshold value $\alpha$", the process goes to a step 107. In such a situation, the gap between the brake pads and the disc rotor has not yet brought to zero, and thereby the vehicle deceleration is not yet increased.

Therefore, at the step 107, the latest wheel-pressure amount, which corresponds to the pressure command signal sent to the braking force control unit (the hydraulic brake actuator 50 and so on), is memorized as a signal for the gap-zero pressure. Then, the process moves on to a step 109, at which the estimation for the gap amount is memorized as "not having been completed".

When the ECU determines at the step 106 that the vehicle deceleration is increased over the predetermined value, the gap between the brake pads and the disc rotor has been brought to zero and the vehicle deceleration will be increased. Therefore, the process goes to a step 110, at which the estimation for the gap amount is memorized as "having been completed".

After the subsequent calculating cycle, the process goes from the step 100 to a step 102, at which the gap-zero pressure of the previous cycle is made as the gap-zero pressure of the current cycle. Then, the pressure-command-signal memorizing process is ended.

As above, the brake fluid pressure applied to the wheel cylinders is gradually increased, when neither the accelerating operation nor the decelerating operation is carried out during the vehicle running and thereby the deceleration is stable. And the pressure command signal is gradually increased to obtain the signal for the gap-zero pressure (with which the gap between the brake pads and the disc rotor to zero is brought to zero), by detecting the increase of the deceleration caused by the increase of the brake fluid pressure.

An operation of the pre-charge control, which is carried out by the pressure command signal memorized in the above pressure-command-signal memorizing process, will be explained. FIG. 6 shows an example of an initial position for the wheel cylinder W/C, the disc rotor D/R and the brake pads $P_{out}$ and $P_{in}$. In FIG. 6, a gap "G" (not shown in FIG. 6) between the brake pads and the disc rotor is an amount, which is calculated by subtracting, from an inner width "Y" of the wheel cylinder W/C, thickness "$T_{out}$" and "$T_{in}$" of the brake pads $P_{out}$ and $P_{in}$, thickness "$T_r$" of the disc rotor D/R and an initial push-out amount "X" of the brake pads $P_{out}$ and $P_{in}$ (namely, "G"="Y"-"$T_{out}$"-"$T_{in}$"-"$T_r$"-"X").

When the pressure-command-signal memorizing process is carried out, the pressure command signal for the gap-zero pressure (a gap-zero pressure signal) is calculated and memorized, as explained above. When the brake pads are operated by the pre-charge control with such gap-zero pressure signal, the gap "G" between the brake pads and the disc rotor is brought into zero.

Figure 4:
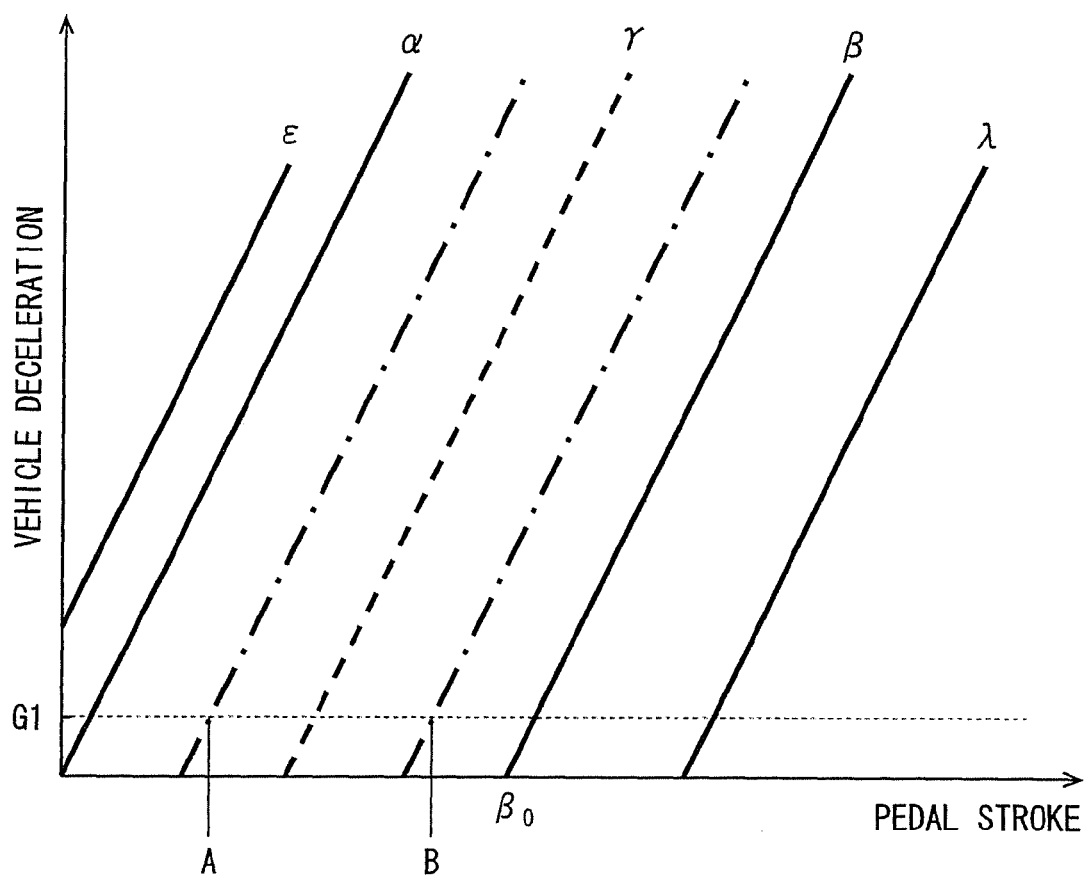
FIG. 4 is a graph showing an example of relationship between a pedal stroke and a vehicle deceleration, when a braking operation is carried out by a vehicle driver.

When the pre-charge control for the gap between the brake pads and the disc rotor is not carried out, a relationship between the vehicle deceleration and the pedal stroke in case of the braking operation of the vehicle driver is indicated by a line "$\beta$" in FIG. 4. As shown in FIG. 4, the braking force is not applied to the vehicle wheels until the pedal stroke reaches at an amount "$\beta_0$" (it is called as a delayed effect of the braking operation).

On the other hand, when the braking operation is carried out after the pre-charge control has been done with the pressure command signal (the gap-zero pressure signal), the braking operation as indicated by a line "$\alpha$" in FIG. 4 (which has no delay in applying the braking force) can be achieved, because the brake pedal is stepped forward at a position at which the gap between the brake pads and the disc rotor is zero.

The vehicle deceleration indicated in the vertical line of FIG. 4 may be replaced by an increased amount of the vehicle deceleration from a vehicle deceleration at starting the pre-charge control, or by an increased amount of the vehicle deceleration from a vehicle deceleration generated by vehicle running resistance calculated based on vehicle speed, a gear position of a transmission apparatus, inclination of a road surface, and so on.

When the pre-charge control is frequently carried out during a vehicle traveling period in order to bring the gap between the brake pads and the disc rotor to zero, the brake pads may be worn away and/or temperature of the brake pads may be increased due to contacts between the brake pads and the disc rotor. Therefore, it may be preferable to correct the memorized pressure command signal so that the brake fluid pressure is controlled at such a pressure, at which the vehicle deceleration may not be caused, and the pre-charge control may be carried out with such corrected pressure command signal. Furthermore, in such a correction, the pressure command signal may be corrected based on a predetermined constant.

For example, a half of the brake fluid pressure, which is achieved by the pressure command signal memorized in the pressure-command-signal memorizing process, may be set as a brake fluid pressure at which the vehicle deceleration may not be caused. In this case, the pressure command signal may be corrected to become one-half, when the pressure-command-signal memorizing process is carried out. As a result of such correction, the brake pads are not pushed forward to the disc rotor at such a position at which the gap between the brake pads and the disc rotor is brought to zero. The contact of the brake pads and the disc rotor is thereby avoided. In this case, the delayed effect of the braking operation can be reduced to a half delay time, as indicated by a dotted line "$\gamma$" in FIG. 4. Needless to say, the correction of the pressure command signal may not be necessarily done so as to make its value to the half. A correction amount for the pressure command signal may be changed depending on vehicle speed, vehicle weight, vehicle running condition of inclination of a road surface, the accelerating operation of the vehicle driver, a steering operation of the vehicle driver, and so on.

Figure 7:
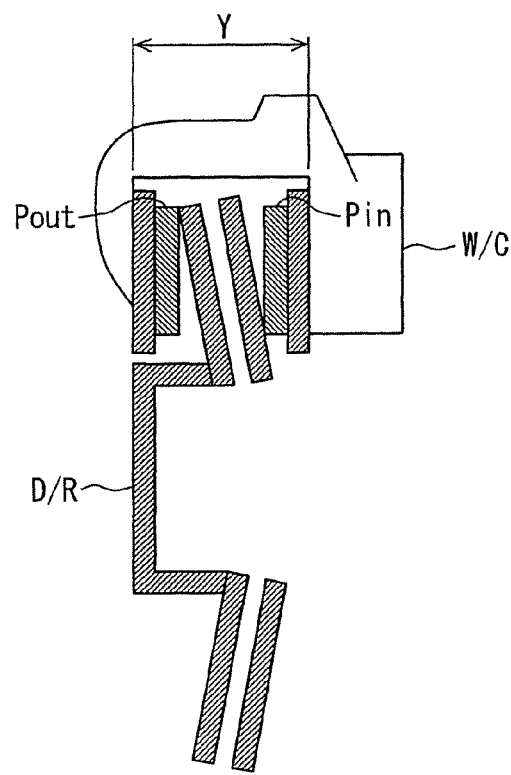
FIG. 7 shows an example for respective positions of the wheel cylinder, the disc rotor and the brake pads, in case of thermal inclination.

Next, an operation will be explained when the gap between the brake pads and the disc rotor is changed from its initial condition. The temperature of the disc rotor is largely increased and thereby thermally expanded, when the braking operation is excessively carried out, for example, when the vehicle is decelerated from a high-speed running condition by repeating the braking operation, or when the braking operation is repeatedly carried out on a down-slope. A sliding surface of the disc rotor, which is brought into contact with the brake pads, may be inclined due to such thermal expansion (such inclination is referred to as "thermal inclination"). FIG. 7 shows an example for respective positions of the wheel cylinder, brake pads, and the disc rotor, when the thermal inclination occurred.

As shown in FIG. 7, when the thermal inclination occurs, the disc rotor D/R and the brake pads $P_{out}$ and $P_{in}$ may be brought into contact with each other, so that the gap between them becomes zero. In addition, the disc rotor D/R may push back the brake pads $P_{out}$ and $P_{in}$ and thereby an initial push-out amount of the brake pads $P_{out}$ and $P_{in}$ may be decreased. When the pre-charge control is carried out in such a condition (in the thermal inclination), for example when the pre-charge control is carried out by the brake fluid pressure achieved by the pressure command signal (corresponding to the half of the memorized pressure command signal for the gap-zero pressure) and thereafter the braking operation is carried out by the vehicle driver, the relationship between the vehicle deceleration and the pedal stroke becomes to such a line indicated by "ϵ" of FIG. 4. Accordingly, the deceleration is applied to the vehicle, when the pre-charge control is carried out.

Figure 8:
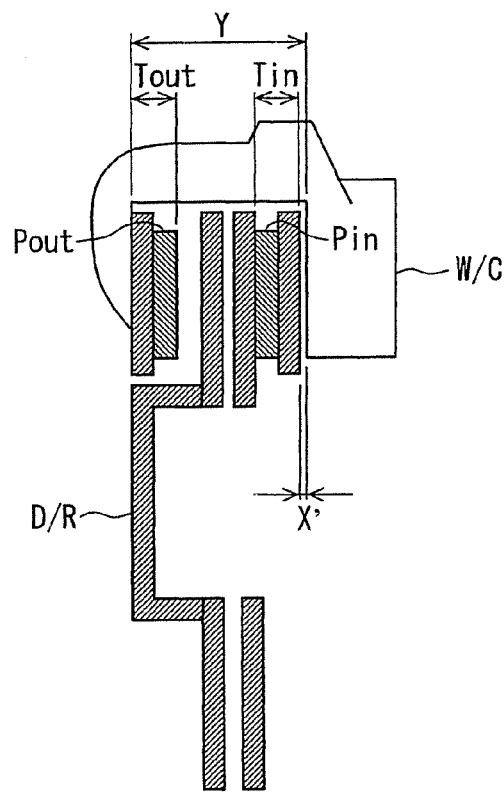
FIG. 8 shows an example for respective positions of the wheel cylinder, the disc rotor and the brake pads, which are restored from the thermal inclination.

When the disc rotor D/R is thereafter sufficiently cooled down by wind of vehicle running, the disc rotor D/R is restored to its original figure (the thermal inclination is eliminated), as shown in FIG. 8. However, the initial push-out amount "X" of the brake pads $P_{out}$ and $P_{in}$ is reduced to an amount "X'", when compared with the condition shown in FIG. 6 (the condition before occurrence of the thermal inclination). This is because the brake pads Pout and $P_{in}$ were pushed back due to the thermal inclination. As a result, the gap between the brake pads $P_{out}$ and $P_{in}$ and the disc rotor D/R in the initial condition is correspondingly increased, when compared with the condition of FIG. 6. Accordingly, the gap can not be made to zero, even if pre-charge control is carried out based on the memorized pressure command signal (the gap-zero pressure signal).

As explained above, the relationship between the vehicle deceleration and the pedal stroke is indicated by the dotted line "γ" in FIG. 4, when the pre-charge control is carried out for the initial condition of the disc rotor of FIG. 6 based on the half of the gap-zero pressure signal.

On the other hand, the relationship between the vehicle deceleration and the pedal stroke will become to such a line indicated by "λ" shown in FIG. 4, if the pre-charge control was carried out for the initial condition of the disc rotor of FIG. 8 based on the half of the gap-zero pressure signal, in the following case. It will be the case, in which the gap (shown in FIG. 8) between the brake pads and the disc rotor is doubled after the disc rotor was restored from the thermal inclination to the initial configuration, when compared with the gap shown in FIG. 6.

As a result, the relationship indicated by the line "λ" is far away from the expected relationship indicated by the dotted line "γ", and the vehicle driver may feel the delayed effect of the braking operation.

As above, the relationship between the vehicle deceleration and the pedal stroke may become the lines "ϵ" or "λ" of FIG. 4 (which are far away from the expected line "γ"), when the pre-charge control is carried out based on a predetermined pressure even in the case that the gap between the brake pads and the disc rotor is changed from the initial condition.

According to the embodiment of the present invention, however, the delayed effect of the braking operation is avoided in the actual braking operation of the vehicle driver even after the pre-charge control is carried out, namely even after the gap between the brake pads and the disc rotor is changed. This can be achieved by carrying out the pressure-command-signal memorizing process even when the gap between the brake pads and the disc rotor is changed, and by memorizing the pressure command signal (the gap-zero pressure signal), with which the changed gap may be made to zero.

Figure 5:
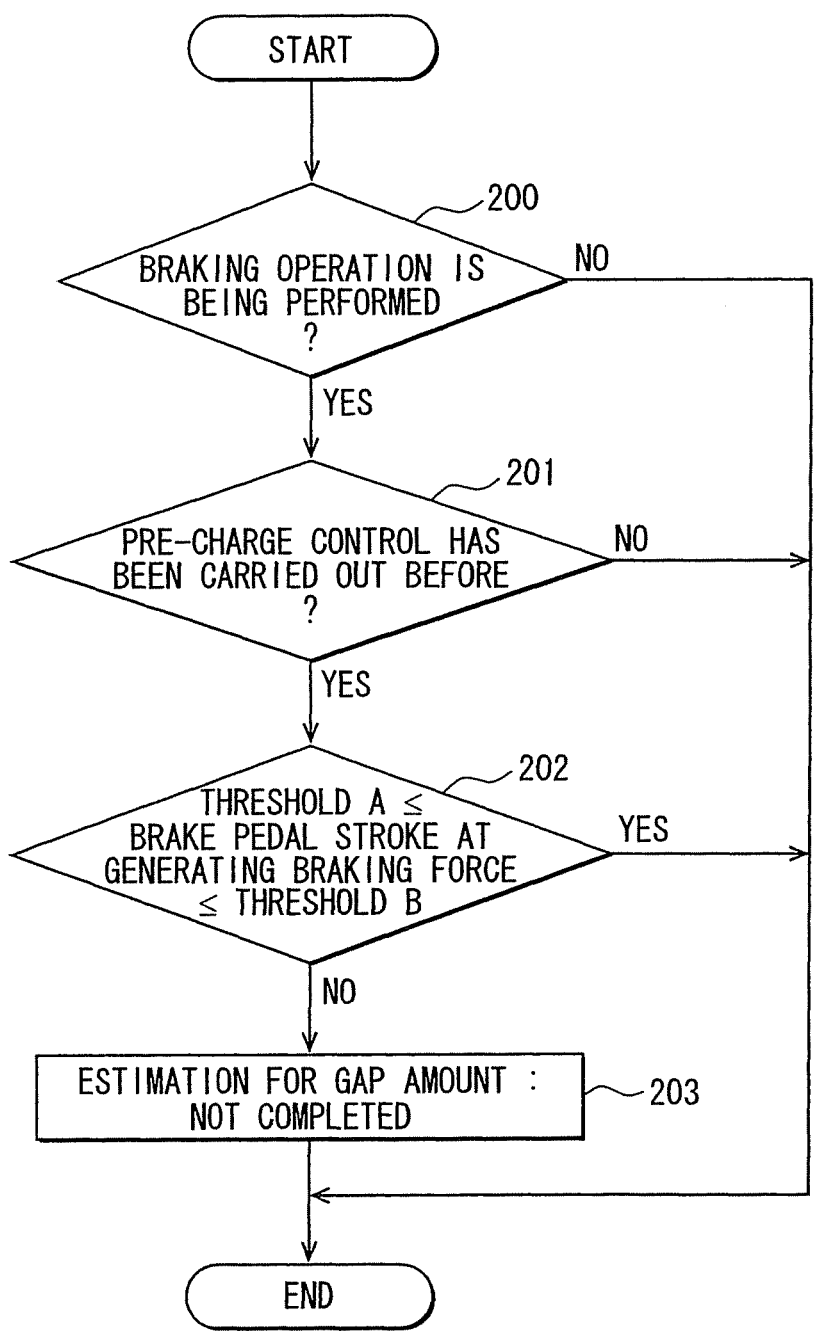
FIG. 5 is a flow-chart showing a process for setting estimation for gap amount as "not having been completed"

The pressure-command-signal memorizing process may be carried out for each time when an ignition switch is turned on. Furthermore, the pressure-command-signal memorizing process may be carried out in the following manner. A pedal stroke sensor is used as the braking operation detecting device 11a, and the relationship between the brake pedal stroke and the vehicle deceleration during the braking operation is monitored by a combination of the pedal stroke sensor and the vehicle deceleration detecting device 80. And when the relationship between the brake pedal stroke and the vehicle deceleration becomes out of a predetermined range, the pressure-command-signal memorizing process is carried out again. FIG. 5 is a flow-chart showing a process for setting the estimation for the gap amount as "not having been completed", when the relationship between the brake pedal stroke and the vehicle deceleration becomes out of the predetermined range (a normal range).

At a step 200, the ECU 70 determines whether the braking operation is being performed. When the braking operation is being performed, the process goes to a step 201, whereas when the braking operation is not being performed, the process is ended. At the step 201, the ECU 70 determines whether the pre-charge control has been carried out before the current braking operation. When the pre-charge control has not been carried out, the process is ended. When the pre-charge control was carried out, the process goes to a step 202, at which the ECU 70 compares the brake pedal stroke at generating the braking force with threshold values A and B.

For example, an area between two one-dot-chain lines A and B, which are located on right and left sides of the line "γ" in FIG. 4, is regarded as a normal range for the pedal stroke and the deceleration. In the case that the pedal stroke is between the threshold values A and B, when a small deceleration "G1" is generated at the vehicle, the ECU 70 determines that the pre-charge control has been correctly carried out. When the pedal stroke is not located in the normal range (between the lines A and B), the process goes to a step 203, at which the estimation for the gap amount is memorized as "not having been completed". Then, the process of FIG. 3 is carried out again.

The ECU 70, therefore, determines at the step 202 that the pedal stroke is not in the normal range, when the relationship between the vehicle deceleration and the pedal stroke becomes to the line "ϵ" of FIG. 4 because of the thermal inclination, or when the relationship between the vehicle deceleration and the pedal stroke becomes to the line "λ" of FIG. 4 because the disc rotor is restored to its initial configuration after the thermal inclination. Then, the ECU 70 memorizes at the step 203 that the estimation for the gap amount has not yet been completed, so that the pressure-command-signal memorizing process is carried out again. Accordingly, it can be possible to obtain the pressure command signal, which depends on the gap between the brake pads and the disc rotor, even when the gap is changed due to the thermal inclination.

What is claimed is:

1. A brake control apparatus for a vehicle comprising:
an electronic control unit for controlling the brake control apparatus;
a braking force control unit having a non-friction element provided at each of vehicle wheels, a friction element to be pushed against the non-friction element to generate braking force at respective vehicle wheels, and a hydraulic brake actuator for controlling brake fluid pressure applied to the friction element upon receiving a pressure command signal from the electronic control unit; and
a vehicle deceleration detecting device for detecting vehicle deceleration, wherein the electronic control unit has a pressure-command-signal memorizing portion, which outputs the pressure command signal to the braking force control unit, when a braking operation is not carried out by a vehicle driver, in order to gradually increase the brake fluid pressure, the pressure-command-signal memorizing portion carries out a pressure-command-signal memorizing process so as to memorize the pressure command signal as a gap-zero pressure signal, which is sent to the braking force control unit and which is obtained when the braking operation is not carried out by the vehicle driver but a vehicle speed is decreased by the pressure command signal and when the vehicle deceleration detected by the vehicle deceleration detecting device exceeds a predetermined value, and the electronic control unit further has a pre-charge control portion, which outputs the gap-zero pressure signal to the braking force control unit in order to carry out a pre-charge control, when the braking operation is not carried out by the vehicle driver, so that the friction element is pushed forward to the non-friction element in order that a gap between the friction element and the non-friction element is reduced to a desired amount before an actual braking operation by the vehicle driver, wherein the brake control apparatus has a pedal stroke sensor for detecting a pedal stroke of a brake pedal operated by the vehicle driver, wherein the pressure-command-signal memorizing portion determines whether the pedal stroke, which is detected by the pedal stroke sensor when the vehicle deceleration detected by the vehicle deceleration detecting device exceeds the predetermined value, is within a predetermined range, and the pressure-command-signal memorizing portion carries out the pressure-command-signal memorizing process again when the pedal stroke is not within the predetermined range in order to obtain and memorize a new gap-zero pressure signal.

2. The brake control apparatus according to the claim 1, wherein the pre-charge control portion corrects the gap-zero pressure signal to such a corrected amount, with which no braking force is applied to the vehicle, and the pre-charge control portion carries out the pre-charge control based on the corrected amount of the gap-zero pressure signal.

3. The brake control apparatus according to the claim 2, further comprising:

a braking operation detecting device for detecting whether the braking operation is carried out by the vehicle driver, wherein the pre-charge control portion outputs the pressure command signal to the braking force control unit, when a start of the braking operation is detected.

4. The brake control apparatus according to the claim 1, further comprising:

a braking operation detecting device for detecting whether the braking operation is carried out by the vehicle driver, wherein the pre-charge control portion outputs the pressure command signal to the braking force control unit, when a start of the braking operation is detected.

* * * * *